(12) United States Patent
De Nardi

(10) Patent No.: US 10,514,545 B2
(45) Date of Patent: Dec. 24, 2019

(54) SELECTIVE TRACKING OF A HEAD-MOUNTED DISPLAY

(71) Applicant: Facebook Technologies, LLC, Menlo Park, CA (US)

(72) Inventor: Renzo De Nardi, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 66 days.

(21) Appl. No.: 15/835,846

(22) Filed: Dec. 8, 2017

(65) Prior Publication Data
US 2019/0179146 A1   Jun. 13, 2019

(51) Int. Cl.
*G06K 9/00* (2006.01)
*G02B 27/01* (2006.01)
(Continued)

(52) U.S. Cl.
CPC ......... *G02B 27/0172* (2013.01); *G01B 7/004* (2013.01); *G01S 3/7865* (2013.01);
(Continued)

(58) Field of Classification Search
CPC .............. G02B 27/0172; G02B 27/018; G02B 2027/0138; G02B 2027/0178; G02B 2027/0187; G02B 2027/014; G02B 2027/0134; G02B 2027/0118; G06T 7/246; G06T 7/536; G06T 7/579; G06T 7/74; G06T 19/006; G06T 2207/10028; G01S 3/7865; G01B 7/004; G06F 3/011; G06F 3/013; G06F 3/012; G06F 3/016; G06F 3/017; G06F 3/04815; G06F 3/0304; G06F 3/03046; G06F 1/163;
G06F 1/1654; G06F 1/1632; A63F 13/211; A63F 13/212; A63F 13/213; A63F 13/25; A63F 13/285; A63F 2300/1037; G02C 11/10; G02C 2200/02; G06K 9/2036; G09G 2340/0464; G09G 2340/14; G09G 2354/00; G09G 2360/04; H04N 13/332; H04N 13/366;
(Continued)

(56) References Cited

U.S. PATENT DOCUMENTS 10,261,327 B2 * 4/2019 Nishizawa .............. G06F 1/163
10,317,989 B2 * 6/2019 Rouvinez .............. G06T 19/006
(Continued)

FOREIGN PATENT DOCUMENTS

WO   WO 2017/139871 A1   8/2017

OTHER PUBLICATIONS

PCT International Search Report and Written Opinion, PCT Application No. PCT/US2018/064560, dated Apr. 12, 2019, 9 pages.

*Primary Examiner* — Jose L Couso
(74) *Attorney, Agent, or Firm* — Fenwick & West LLP

(57) ABSTRACT

A tracking system tracks a target object separated from a head-mounted display (HMD). The tracking system includes a first tracking device (e.g., a camera), a second tracking device (e.g., magnetic tracking system), and a selective tracking system. The first tracking device determines a position of the target object using the first type of tracking information, and determines a tracking error that is associated with the determined position. The selective tracking system compares the tracking error to a threshold value, and based on the comparison, determines a position of the target object using the second tracking device.

12 Claims, 7 Drawing Sheets

(51) Int. Cl.
*G01S 3/786* (2006.01)
*G06T 7/246* (2017.01)
*G01B 7/004* (2006.01)

(52) U.S. Cl.
CPC ............ *G02B 27/017* (2013.01); *G06T 7/246* (2017.01); *G02B 2027/0138* (2013.01); *G02B 2027/0187* (2013.01)

(58) Field of Classification Search
CPC .. H04N 13/254; H04N 13/271; H04N 13/207; H04N 13/243; H04N 13/344; H04N 19/167
See application file for complete search history.

(56) References Cited

U.S. PATENT DOCUMENTS

| | | | |
|---|---|---|---|
| 2012/0281181 A1* | 11/2012 | Chen | ........................ G02C 7/04 351/159.03 |
| 2016/0246370 A1* | 8/2016 | Osman | .................. A63F 13/428 |
| 2017/0017088 A1 | 1/2017 | Murray et al. | |
| 2017/0205903 A1 | 7/2017 | Miller et al. | |
| 2017/0262045 A1* | 9/2017 | Rouvinez | .............. G06T 19/006 |
| 2017/0287219 A1 | 10/2017 | Poulos et al. | |
| 2017/0307891 A1* | 10/2017 | Bucknor | ................... G01S 1/70 |
| 2018/0004283 A1* | 1/2018 | Mathey-Owens | ........................... G06F 3/04815 |
| 2018/0053056 A1* | 2/2018 | Rabinovich | ............. G06F 3/011 |
| 2018/0164878 A1* | 6/2018 | McGee | ................ G06F 3/012 |
| 2018/0173323 A1* | 6/2018 | Harvey | ................ G06T 19/006 |
| 2018/0340804 A1* | 11/2018 | Cherkashin | ............. G01D 5/12 |
| 2019/0102939 A1* | 4/2019 | He | ......... G06T 19/003 |
| 2019/0102941 A1* | 4/2019 | Khan | .................. H04N 13/243 |
| 2019/0107718 A1* | 4/2019 | Pedrotti | ............. G02B 27/0149 |
| 2019/0179148 A1* | 6/2019 | Hori | .................... G02B 27/0172 |
| 2019/0187473 A1* | 6/2019 | Tomizawa | ......... G02B 27/0172 |
| 2019/0187876 A1* | 6/2019 | Platt | ..................... H04N 13/344 |
| 2019/0227642 A1* | 7/2019 | Nishizawa | ............ G06F 3/0346 |

* cited by examiner

SELECTIVE TRACKING OF A HEAD-MOUNTED DISPLAY

BACKGROUND

The present disclosure generally relates to head-mounted display (HMD), and specifically relates to a selective tracking system for HMD.

Use of HMD devices in virtual reality (VR) or augmented reality (AR) environment has become more commonplace. Conventional HMD devices commonly receive voice inputs, gestures, inputs from interaction with one or more of a limited number of buttons or touch area on a HMD device. Many of these input mechanisms are inconvenient or awkward for users to implement in various contexts. Existing systems include controllers separate from a HMD device and use tracking devices to track the controllers. However, current tracking devices have limited fields of view, which can fail to track a controller when a user moves the controllers outside the field of view of the tracking devices. Accordingly, functions of a controller in a conventional system may be limited due to failure of conventional system to track the controller beyond a field view of a corresponding tracking device.

SUMMARY

A selective tracking system tracks one or more target objects in a local area surrounding a HMD. The one or more target objects are coupled to but separated from the HMD. The selective tracking system is associated with a first tracking device that generates, in its effective area, a first type of tracking information for a target object and a second tracking device that generates a second type of tracking information for the target object. The selective tracking system selects which tracking device to use for determining a position of the target object.

An embodiment of the first tracking device is an image tracking system. The image tracking system may include, e.g., a camera, a depth camera assembly, or some other system used to track objects in a local area. The camera assembly captures images of a portion of the local area. In some embodiments, the camera assembly is part of a depth camera assembly that includes an illumination source that emits structured light into the local area. The first type of tracking information includes the captured images or depth information generated based on the captured images. An embodiment of the second tracking device is a magnetic tracking system including one or more magnetic sensor and one or more magnetic field generators. The magnetic sensors are included in the HMD, and the magnetic field generators are located on the target object. The magnetic sensors detects magnetic fields generated by the magnetic field generators. The second type of tracking information includes directions and strengths of the magnetic fields or spatial relationship of the magnetic sensors and magnetic field generators.

The selective tracking system selects a tracking system to determine a position of the target object based on a tracking error associated with the first tracking device. The tracking error, in some embodiment, indicates that the target object is outside the effective area of the first tracking device. For example, in instances where the first tracking device is the depth camera assembly, the tracking error indicates that the target object is not in an effective field of view of the depth camera assembly. The tracking error can be determined based on images generated by the image tracking device. For example, it is determined that there is a tracking error in response to the images not having at least a threshold percentage (e.g., 80%) of the target object.

In one embodiment, the selective tracing system selects the first tracking device by default. But upon a determination that the first tracking device is associated with the tracking error, the selective tracking system selects the second tracking device. In some embodiment, the second tracking device generates the second type of tracking information whether it is selected or not. Alternatively, the second tracking device does not generate the second type of tracking information unless it is selected.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
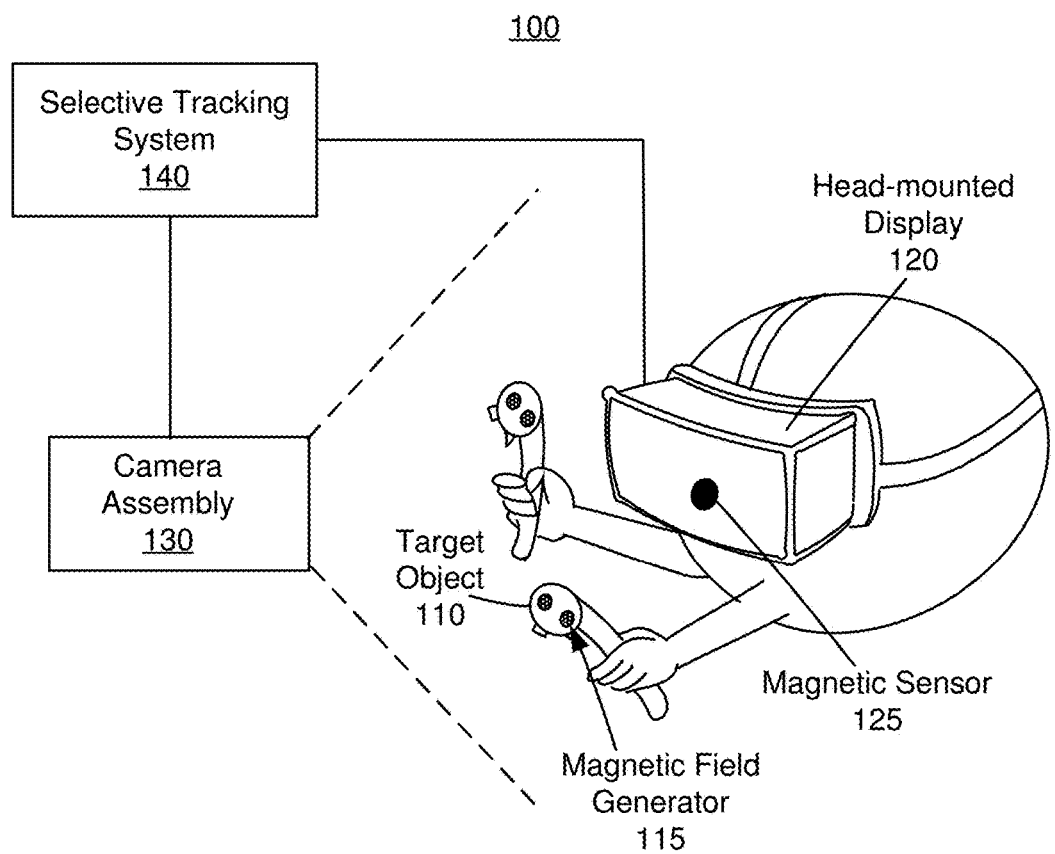
FIG. 1 illustrates a tracking system where a selective tracking system tracks a target object coupled to a HMD, in accordance with one or more embodiments.

FIG. 1 illustrates a tracking system 100 where a selective tracking system 140 tracks a target object 120 coupled to a HMD 120, in accordance with one or more embodiments. The tracking system 100 further includes a camera assembly 130. In other embodiments, the tracking system 100 may include different, additional or fewer components. For example, the tracking system 100 may include a different number of target objects 120. Additionally, the tracking system 100 may include a HMD console coupled to the HMD 120. The selective tracking system 140 may be part of the HMD console.

The target object 110 provides an input interface that allows users of the HMD 120 to control the HMD 120. For example, the target object 110 may be, a user controller, a wand, etc., that includes one or more buttons, keys, clickable pads, scrolling wheel/balls, voice input devices, or any combination thereof that allow a user to control media presentation by the HMD 120. The user can move the target object 110 in a local area surrounding the HMD 120.

Positions of the target object 110 in the local area can be tracked by the selective tracking system 140. In the embodiment of FIG. 1, the HMD 120 is coupled to two target objects, each of which is controlled by a hand of a user of the HMD 120.

As shown in FIG. 1, the target object 110 includes two magnetic field generators 115. Each of the magnetic field generators 115 generates magnetic fields for tracking the target object 110. In some embodiments, a magnetic field generator 115 (such as a permanent or electro magnet) is located at a predefined (e.g., known) location on the target object 110 and generates a magnetic field that is fixed in relation to the target object 110. Accordingly, spatial positions (and/or orientations) of the magnetic field generators 115 indicate spatial positions (and/or orientations) of the target object 110.

A magnetic field generator 115 includes one or more magnets. Each magnet may be configured to generate a corresponding magnetic field oriented along a distinct direction (e.g., a distinct coordinate axis) from other magnets of that magnetic generator. In some embodiments, a magnetic field generator 115 comprises one or more programmable magnets (e.g., a polymagnet) that provide programmable (e.g., software-controlled) magnetic field properties. These programmable magnets enable control over and programmable variability of a number of magnetic poles, a density of magnetic poles (number of magnetic poles over a given surface area), a spatial orientation/configuration/layout of magnetic poles, magnetic field strength, a variation of magnetic field strength as a function of spatial coordinates (e.g., distance from the magnetic field generator 115), focal points of the magnetic field, mechanical forces (e.g., attraction, repulsion, holding, alignment forces) between poles of the same polymagnet or between polymagnets, and so on. The target object 110 may have more than two magnetic field generators 115. Similarly, the target object 110 may have one magnetic field generator 115, e.g., in embodiments where the HMD 120 includes multiple magnetic sensors 115.

The HMD 120 is a head-mounted display that presents content to a user comprising virtual and/or augmented views of a physical, real-world environment with computer-generated elements (e.g., 2D or 3D images, 2D or 3D video, sound, etc.). Examples of media presented by the HMD 120 include one or more images, video, audio, or some combination thereof. In some embodiments, audio is presented via an external device (e.g., speakers and/or headphones) that receives audio information from the HMD 120 and presents audio data based on the audio information.

The HMD 120 includes a magnetic sensor 125 that detects magnetic fields generated by the magnetic field generators 115. In the embodiment of FIG. 1, a single magnetic sensor 125 is included in the HMD 120. Alternatively, the HMD 120 can include multiple magnetic sensor 125 that detects the magnetic fields generated by the magnetic field generators 115. In some embodiments, the magnetic sensor 125 includes one or more constituent sensing elements (e.g., one or more magnetometers). In some embodiments, each sensing element (magnetometer) is placed at a distinct known location with respect to other sensing elements within the magnetic sensor. Alternatively or additionally, each sensing element (magnetometer) is configured to generate a signal responsive to a detected magnetic field that is oriented along a distinct direction (e.g., a distinct coordinate axis).

The magnetic sensor 125 and the magnetic field generators 115 are components of a magnetic tracking system. The magnetic tracking system further includes a magnetic tracking module that determines magnetic tracking information based on the magnetic sensor 125's detection of the magnetic fields generated by the magnetic field generators 115. The magnetic tracking information can include directions and strengths of detected magnetic fields. Alternatively or additionally, the magnetic tracking information includes spatial relationship between the magnetic sensor 125 and the magnetic field generators 115. For example, the magnetic tracking module can use a model of an expected magnetic field (which may be calibrated upon initial use) to determine the spatial relationship between the magnetic sensor 125 and the magnetic field generators 115. Accordingly, relative positions between the HMD 120 and the target objects 120 can be determined. More details regarding spatial relationship between magnetic sensors and the magnetic field generators are described in conjunction with FIGS. 4A-B.

The magnetic tracking module can further send the magnetic tracking information to the selective tracking system 140. The magnetic tracking module, in one embodiment, is included in the HMD 120. Alternatively, part of the magnetic tracking module, e.g., the software component of the magnetic tracking module, can be included in a HMD console. More details about the magnetic tracking system are described in conjunction with FIG. 5.

The camera assembly 130 includes one or more cameras that capture images of the local area surrounding the HMD 120. The camera assembly 130 has an effective field of view for each of the target objects 120. The effective field of view for the target object 110 is a portion of the local area. In one embodiment, the effective field of view for the target object 110 is a portion of the local area that includes the whole target object 110. In an alternative embodiment, the effective field of view for the target object 110 is a portion of the local area that includes at least a threshold percentage of the target object 110. The threshold percentage, for example, can be 80%. The camera assembly 130 includes sensors (e.g., photodiodes, charge coupled displays, etc.) that convert photons into digital signals that can be stored in one or more memory units. The camera assembly 130 generates images by reading the digital signals. For example, the camera assembly 130 collects light emitted from the emitters (e.g., light emitting diodes) located at predetermined positions of the target object 110 to capture images. Accordingly, the captured images can show positions of the emitters, which indicate a position of the target object 120. Alternatively, the camera assembly 130 collects light reflected from the target object 110. For example, the camera assembly 130 is part of a depth camera assembly that includes an illumination source that emits structured light into the local area. The target object 110 is illuminated by the emitted structured light. The camera assembly 130 can include one or more passive red-green-blue (RGB) cameras, time of flight (TOF) systems, active stereo systems, or some combination thereof.

In one embodiment, the camera assembly 130 is a component of an image tracking system that sends the captured images to the selective tracking system 140 as image tracking information. In an alternative embodiment, the image tracking system further includes an image tracking module that determines depth information based on the captured images. The image tracking system sends the depth information to the selective tracking system 140 as image tracking information.

The selective tracking system 140 selects either the image tracking system or the magnetic tracking system and tracks the target objects 120 according to the selection. In some embodiments, the selective tracking system 140 selects the image tracking device by default. But the selective tracking system 140 selects the magnetic tracking system in response to a determination that the image tracking system is associated with a tracking error. In one embodiment, the tracking error indicate that the target object is outside the effective field of view of the camera assembly 130. For example, the selective tracking system 140 (or the image tracking system) determines whether one or more images of the portion of the local area include at least a threshold percentage of the target object 110. If the images include at least a threshold percentage of the target object 110, the target object 110 is in the effective field of view of the camera assembly 130. After it is determined that the target object 110 is inside the effective view of the camera assembly 130, the selective tracking system 140 determines a positon of a target object 110 based on the image tracking information. After the selective tracking system 140 determines that the target object 110 is outside the effective view of the camera assembly 130, the selective tracking system 140 determines a position of the target object 110 using the magnetic tracking information from the magnetic tracking system.

Another example of the tracking error is that a position of the target object 110 determined based on the image tracking information is off from a predetermined position by at least a threshold value. The threshold value can be a predetermined amount of distance, such as 10 mm or 100 mm. The threshold value can also be a predetermined percentage of a size of the target object 110, such as 10% of a length of the target object 110. The tracking error may be determined by the image tracking system, the selective tracking system 140, or both. Additionally, in some embodiments, the magnetic tracking system may be active whether it is selected or not (i.e., it is always collecting data). Alternatively, the magnetic tracking system stays inactive by default and becomes active after it is selected.

Figure 2:
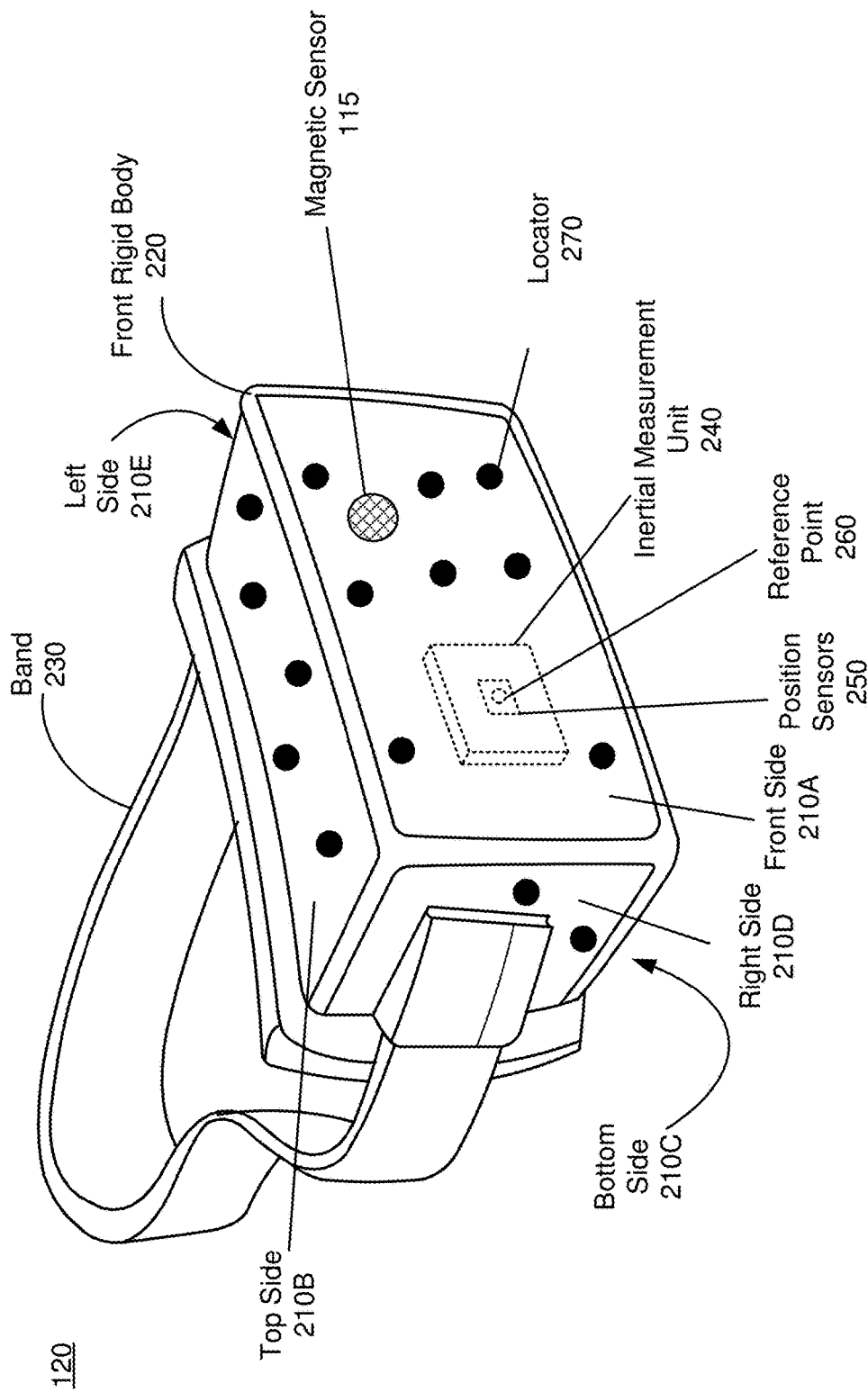
FIG. 2 is a wire diagram of the HMD, in accordance with one or more embodiments.

FIG. 2 is a wire diagram of the HMD 120, in accordance with one or more embodiments. The HMD 120 may be part of, e.g., a VR system, an AR system, a MR (mixed reality) system, or some combination thereof. In embodiments that describe AR system and/or a MR system, portions of the HMD 120 that are between a front side 210A of the HMD 120 and an eye of the user are at least partially transparent (e.g., a partially transparent electronic display). In addition to the front side 210A, the HMD 120 also includes a top side 210B, a bottom side 210C, a right side 210D, a left side 210E, a front rigid body 220, and a band 230. The front rigid body 220 also includes an inertial measurement unit (IMU) 240, the one or more position sensors 250, a reference point 260, and locators 270. In the embodiment shown by FIG. 1, the position sensors 250 are located within the IMU 240, and neither the IMU 240 nor the position sensors 250 are visible to the user.

The IMU 240 is an electronic device that generates IMU data based on measurement signals received from one or more of the position sensors 250. A position sensor 250 generates one or more measurement signals in response to motion of the HMD 120. Examples of position sensors 250 include: one or more accelerometers, one or more gyroscopes, one or more magnetometers, another suitable type of sensor that detects motion, a type of sensor used for error correction of the IMU 240, or some combination thereof. The position sensors 250 may be located external to the IMU 240, internal to the IMU 240, or some combination thereof.

Based on the one or more measurement signals from one or more position sensors 250, the IMU 240 generates IMU data indicating an estimated position of the HMD 120 relative to an initial position of the HMD 120. For example, the position sensors 250 include multiple accelerometers to measure translational motion (forward/back, up/down, left/right) and multiple gyroscopes to measure rotational motion (e.g., pitch, yaw, or roll). In some embodiments, the IMU 240 rapidly samples the measurement signals and calculates the estimated position of the HMD 120 from the sampled data. For example, the IMU 240 integrates the measurement signals received from the accelerometers over time to estimate a velocity vector and integrates the velocity vector over time to determine an estimated position of a reference point on the HMD 120. The reference point 260 is a point that may be used to describe the position of the HMD 120. While the reference point may generally be defined as a point in space; however, in practice the reference point is defined as a point within the HMD 120 (e.g., a center of the IMU 240). The HMD further includes the magnetic sensor 125.

The locators 270 are located in fixed positions on the front rigid body 220 relative to one another and relative to the reference point 260. Thus, the locators 270 can be used to determine positions of the reference point 260 and the HMD 120. As shown in FIG. 2, the locators 270, or portions of the locators 270, are located on a front side 210A, a top side 210B, a bottom side 210C, a right side 210D, and a left side 210E of the front rigid body 220. A locator 270 may be a light emitting diode (LED), a corner cube reflector, a reflective marker, a type of light source that contrasts with an environment in which the HMD 120 operates, or some combination thereof. In embodiments where the locators 270 are active (i.e., an LED or other type of light emitting device), the locators 270 may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof.

In some embodiments, the locators 270 are located beneath an outer surface of the HMD 120, which is transparent to the wavelengths of light emitted or reflected by the locators 270 or is thin enough not to substantially attenuate the wavelengths of light emitted or reflected by the locators 270. Additionally, in some embodiments, the outer surface or other portions of the HMD 120 are opaque in the visible band of wavelengths of light. Thus, the locators 270 may emit light in the IR band under an outer surface that is transparent in the IR band but opaque in the visible band.

Figure 3:
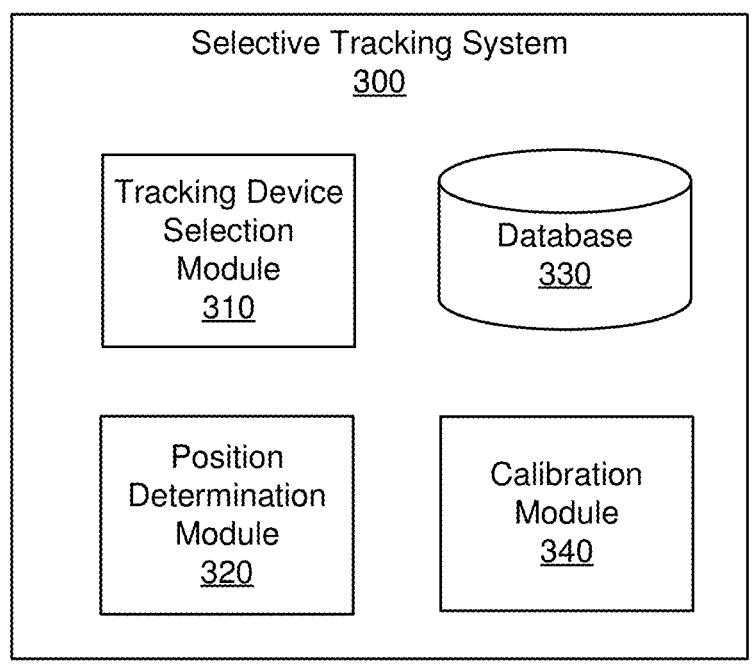
FIG. 3 is a block diagram of the selective tracking system, in accordance with one or more embodiments.

FIG. 3 is a block diagram of the selective tracking system 300, in accordance with one or more embodiments. An embodiment of the selective tracking system 300 is the selective tracking system 140 described in conjunction with FIG. 1. The selective tracking system 300 determines positions of a target object (e.g., the target object 110). The selective tracking system 300 receives tracking information from a first tracking device and a second tracking device (both not shown in FIG. 3). The first tracking device generates a first type of tracking information, while the second tacking device generates a second type of tracking information. In some embodiments, the first tracking device is an image tracking system, e.g., the camera assembly 130 in FIG. 1 and the second tracking device is the magnetic tracking system described in conjunction with FIG. 1.

The selective tracking system 140 includes a tracking device selection module 310, a position determination module 320, a database 330, and a calibration module 340. In other embodiment, the selective tracking system 140 may include different, additional, or fewer components.

The tracking device selection module 310 selects which tracking device (the first tracking device or the second tracking device) to use to determine positions of the target object. The selection is based on a tracking error associated with the first tracking device. In some embodiments, the tracking error indicates that the first type of tracking information generated by the first tracking device cannot effectively determine positions of the target object. For example, the tracking error indicates that the target object it outside an effective area of the first tracking device. As another example, the tracking error indicates that a position of the target object determined based on the first type of tracking information is off a predicted position beyond a threshold value. The tracking error can be generated either by the tracking device selection module 310 or the first tracking device.

In embodiments where the first tracking device is the image tracking system, the tracking device selection module 310 can determine whether the target object is in the effective area of the depth camera assembly of the image tracking system. To determine whether the target object is in the effective area of the depth camera assembly, the tracking device selection module 310 uses images of the local area generated by the image tracking system. For example, the tracking device selection module 310 determines whether the images includes at least threshold percentage of the target object. The threshold percentage can be 80%. If the captured image includes at least 80% of the target object, the tracking device selection module 310 determines that the target object is in the effective area of the depth camera assembly; otherwise, the tracking device selection module 310 determines that the target object is outside the effective area of the depth camera assembly.

After the tracking device selection module 310 determines that the target object is in the effective area of the depth camera assembly, the tracking device selection module 310 selects the image tracking system. For example, the tracking device selection module 310 instructs the positon determine module 320 to use the image tracking information to determine positions of the target object. In contrast, after the tracking device selection module 310 determines that the target object is outside the effective area of the depth camera assembly, the tracking device selection module 310 selects the second tracking device (e.g., the magentic tracking system). The second tracking device may be activated upon the selection to generate the second type of tracking information and send the second type of tracking information (e.g., the magnetic tracking information) to the position determination module 320.

In some embodiments, the tracking device selection module 310 sends tracking instructions to the first tracking device and/or the second tracking device. For example, the tracking device selection module 310 instructs the first tracking device to capture the images. Also, upon selecting the magnetic tracking device, the tracking device selection module 310 can instruct the magnetic field generator of the magnetic tracking device to generate magnetic fields and instructs the magnetic sensor assembly to measure direction and strength of the generated magnetic fields. The tracking instructions can be generated by the tracking device selection module 310 or retrieved from the database 330.

The position determination module 320 determines positions of the target object based on tracking information sent from the tracking device selected by the tracking device selection module 310. In embodiments where a first tracking device is an image tracking system, the position determination module 320 can determine positions of the target object based on images of a portion of the local area. In embodiments where the images show emitters located on predetermined positions of the target object, the position determination module 320 determines positions (and/or orientations) of the emitters, e.g., by comparing the captured images with a model of the emitters. Based on the determined positions of the emitters, the position determination module 320 determines positions of the target object. In alternative embodiments where the images show a structured light pattern reflected from the target object, the position determination module 320 can compare the captured images with a model of the target object to determine positions of the target object. For example, the position determination module 320 determines positions of the target object based on phase-shifted patterns of the portions of the reflected structured light distorted by shapes of the target object in the local area. As another example, for position determination based on time-of-flight, the position determination module 320 determines positions of the target object using a ratio of charge between memory units associated with each photodiode of the depth camera assembly. In addition to the images, the position determination module 320 can also determine positions of the target object based on depth information of the portion of the local area.

After the tracking device selection module 310 selects the second tracking device (e.g., a magnetic tracking system), the position determination module 320 determines positions of the target object based on the second type of tracking information, e.g., magnetic tracking information. For example, the position determination module 320 can compare the detected magnetic fields with an expected model magnetic field to determine positions of the target object. Or the position determination module 320 can determine positions of the target object relative to the HMD based on spatial relationship between magnetic field generators (located on the target object) and magnetic sensors (within the HMD).

The database 330 stores data generated and/or used by the selective tracking system 140. The database 330 is a memory, such as a ROM, DRAM, SRAM, or some combination thereof. The database 330 may be part of a larger digital memory of a HMD system. In some embodiments, the database 330 stores the first and second types of tracking information, baseline data from the calibration module 390 describing trained or established baseline, determined positions of the target object, tracking information, other types of information generated by the selective tracking system 140, or any combination thereof. In some embodiments, the database 330 may store calibration data and/or other data from other components.

The database 330 also stores a model of an expected magnetic field. The model is used to compare to magnetic field detected by the magnetic tracking system to determine positions of the target object relative to the HMD. The database 330 further store a model for the target object or emitters on the target object. The model is used to compare to the captured images to determine positions of the target object. The model stored in the database 330 can be a 3D model which approximates the surface geometry of the object.

In some embodiments, a calibration sequence occurs prior to position determination, and the calibration module 340 generates and/or trains a model of the target object or expected magnetic field stored in the database 150 during the calibration sequence. The calibration module 340 is a software module implemented on one or more processors, a dedicated hardware unit, or some combination thereof. The calibration sequence implemented by the calibration module 340 may involve using the depth camera assembly of the image tracking system to repeatedly scan the target object. These scans of the target object can be interpolated into the model of the target object. Also, the calibration sequence may involve using the magentic sensors to repeatedly detect magentic fields generated by the magentic field generators to determine the expected magentic field.

Figure 4B:
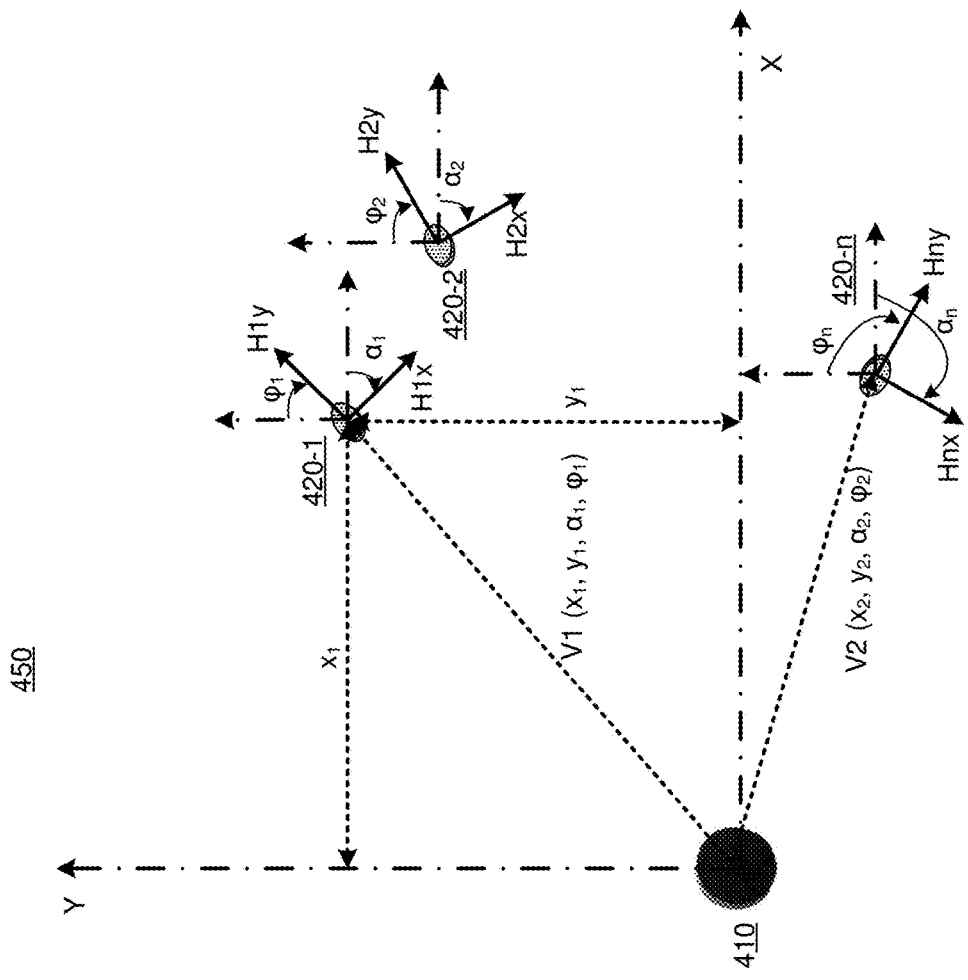
FIG. 4B illustrates a framework for determining spatial positions of multiple magnetic field generators relative to the magnetic sensor, in accordance with one or more embodiments.
Figure 4A:
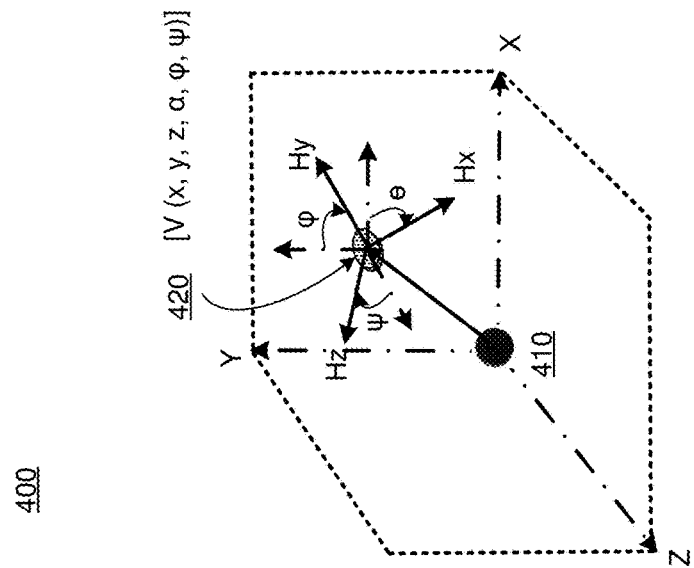
FIG. 4A illustrates a three-dimensional framework for determining spatial positions of a magnetic generator relative to a magnetic sensor, in accordance with one or more embodiments.

FIG. 4A illustrates a three-dimensional framework 400 for determining spatial positions of a magnetic generator 420 relative to a magnetic sensor 410, in accordance with one or more embodiments. In the embodiment of FIG. 4A, a spatial position is expressed as a vector with multiple components representing spatial coordinates (positions and/or orientations) in a multi-dimensional space. In the three dimensional (3D) framework 400, the vector components of a spatial position vector include Cartesian distances along three orthogonal Cartesian coordinate axes (X, Y, Z) and/or angular orientation (angles α, φ, ψ) defined with respect to three mutually perpendicular Cartesian axes (X, Y, Z) or mutually perpendicular Cartesian planes (YZ, XZ, and XY). In some embodiments, the spatial position vectors may include Cartesian distances along three orthogonal Cartesian coordinate axes (X, Y, Z), but not the angular orientations (angles α, φ, ψ).

In one or more embodiments, the magnetic field generator 420 includes one or more magnets; each magnet of a given magnetic generator 420 may be configured to generate a corresponding magnetic field oriented along a distinct direction (e.g., a distinct coordinate axis) from other magnets of that magnetic field generator 420. In some embodiments, the magnetic field generator 420 includes three magnets, the three magnets generating three orthogonal magnetic fields along three orthogonal Cartesian coordinate axes.

Similarly, the magnetic sensor 410 includes one or more constituent sensing elements (e.g., one or more magnetometers), each sensing element (magnetometer) configured to generate a signal responsive to a detected magnetic field that is oriented along a distinct direction (e.g., a distinct coordinate axis). For example, the magnetic sensor 410 includes three sensing elements (such as hall-effect sensors) configured to generate (output) corresponding signals (e.g., current outputs) that are proportional to and responsive to magnetic fields along the three different orthogonal axes (X, Y, and Z) of a three dimensional spatial coordinate system.

A spatial position vector may be defined for the pairing of magnetic field generator 420 and magnetic sensor 410 to represent Cartesian distances along three orthogonal Cartesian coordinate axes (X, Y, Z) between the magnetic field generator 420 and the magnetic sensor 410 included in the pairing. The spatial position vector may also include angular orientations represented as angles (α, φ, ψ) between the magnetic field axes of the magnetic field generator 420 (e.g., Hx, Hy, and Hz) and the sensing axes of the magnetic sensor 410 (e.g., X, Y, and Z). The angles may alternatively be computed with respect to the three mutually perpendicular Cartesian planes (YZ, XZ, and XY) that are defined either for the MS 410 or the MG 420.

A magnetic tracking system may have multiple magnetic field generators corresponding to multiple target objects coupled to the HMD.

FIG. 4B illustrates a framework 450 for determining spatial positions of multiple magnetic field generators 420-1, 420-2, and 420-n relative to the magnetic sensor 410, in accordance with one or more embodiments. For the purpose of simplicity, the framework 450 in FIG. 4B is two-dimensional.

In some embodiments, the magnetic fields (H1x, H1y; H2x, H2y; Hnx, Hny) from the different magnetic field generators 420-1, 420-2, 420-n are distinguishable from each other, allowing the magnetic sensor 410 to be able to identify magnetic fields from different magnetic generators MG 420-1, 420-2, 420-n, allowing separate determination of positions of different magnetic generators MG 420-1, 420-2, 420-n.

As illustrated in FIG. 4B, a spatial position vector (V) including the Cartesian distances (x, y, z) and angular orientations (α, φ, ψ), can be computed based on the signals detected by the magnetic sensor 410 responsive to the magnetic fields (Hx, Hy, and Hz) generated by a MG 420-1, 420-2, 420-n in a 3D Cartesian space.

In some embodiments, in a 3D coordinate system, the spatial ambiguity in positions in the 3D sensor space is resolved by performing 2D projections from the 3D space to a 2D magnetic field space. This 2D projection involves three unknown rotation angles and can be mathematically indicated as below:

$$T_{R,P,Y}H = T_{R,P,Y}\begin{pmatrix} H_x \\ H_y \\ H_z \end{pmatrix} = \begin{pmatrix} H_r \\ H_\theta \\ 0 \end{pmatrix} = \begin{pmatrix} M\cos\theta/2\pi r^3 \\ M\sin\theta/4\pi r^3 \\ 0 \end{pmatrix} \quad (1)$$

where H is a sensor vector and $T_{R,P,Y}$ is a rotation matrix with three unknown variables R (Raw), P (Pitch) and Y (Yaw) corresponding to angular orientations (α, φ, ψ), to project the 3D sensor space to the 2D magnetic-field space. As equation (1) is an under-constrained system, there are three equations ($H_x$, $H_y$, $H_z$) for determining five unknown variables (R, P, Y, r, θ). In some embodiments a searching process that determines a global optimal solution is used to solve for the unknown variables (e.g., R, P, Y).

Figure 5:
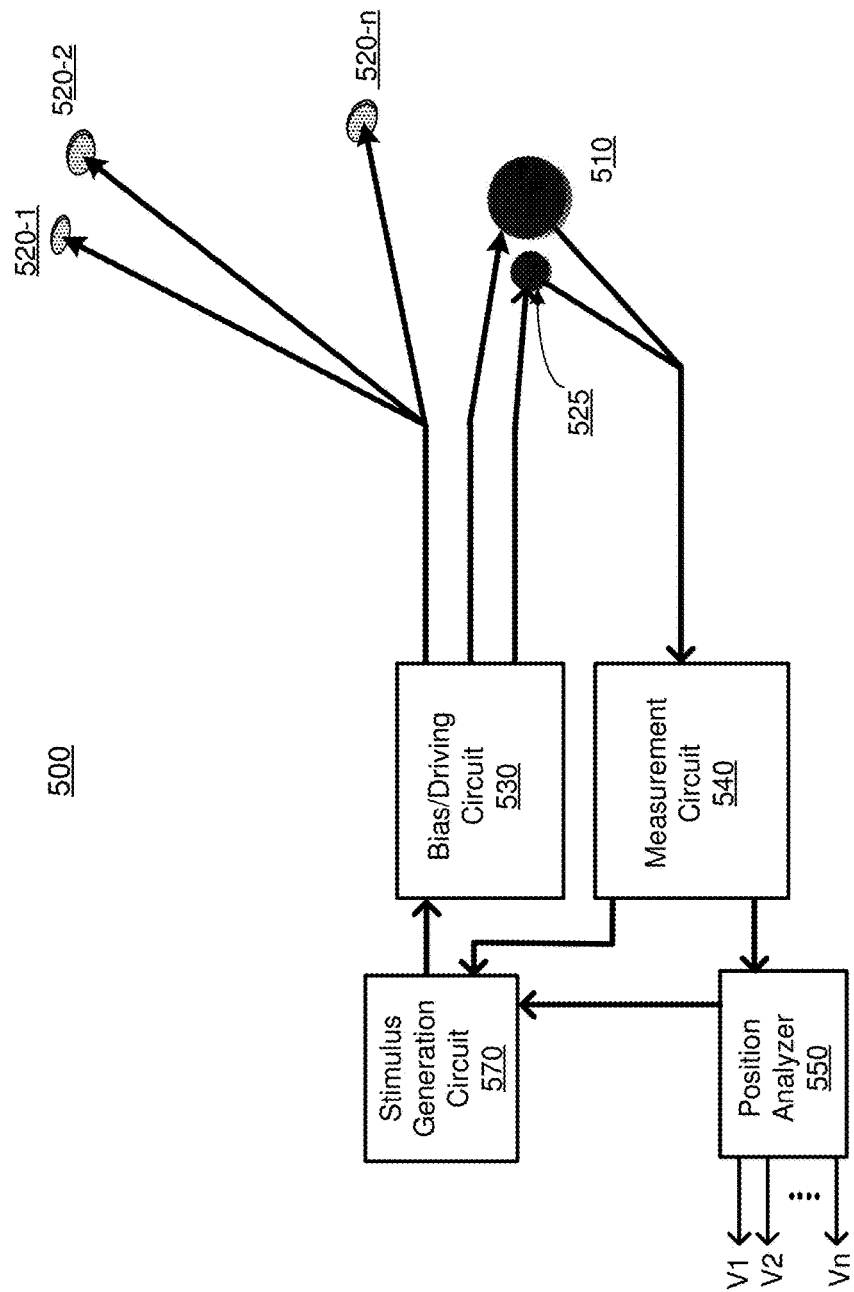
FIG. 5 illustrates a magnetic tracking system for determining positions of magnetic field generators relative to a magnetic sensor, in accordance with one or more embodiments.

FIG. 5 illustrates a magnetic tracking system 500 for determining positions of magnetic field generators 520-1, 520-2, 520-n relative to a magnetic sensor 510, in accordance with one or more embodiments. The magnetic tracking system 500 further includes a bias/driving circuit 530, a measurement circuit 540, a position analyzer 550, an orientation analyzer 560, and a stimulus generation circuit 570. In various embodiments, the magnetic tracking system 500 may include different or additional components than those described in conjunction with FIG. 5. Additionally, functionality provided by different components described below in conjunction with FIG. 5 may be differently allocated among various components of the magnetic tracking system 500 in some embodiments. For example, the magnetic tracking system 500 may include a magnetic sensor assembly that includes the magnetic sensor 510, the bias/driving circuit 530, the measurement circuit 540, the position analyzer 550, the orientation analyzer 560, and the stimulus generation circuit 570.

In the example shown in FIG. 5, the magnetic tracking system 500 includes the magnetic sensor 510 and one or more additional magnetic sensors 525. Additionally, the magnetic tracking system 500 includes one or more magnetic field generators 520-1, 520-2, 520-n. The additional sensors 525 may include inertial sensors such as accelerometers and gyroscopes.

The magnetic tracking system 500 also includes a bias/driving circuit 530 for providing bias signals (such as power and other operating signals) and driving signals (such as stimulating/driving currents and voltages) to the magnetic sensor 510, to the one or more additional sensors 525, and to the magnetic field generators 520-1, 520-2, 520-n. The driving signals provided to each of the magnetic field generators 520-1, 520-2, 520-n may be disambiguated from the corresponding driving signals provided to other magnetic field generators 520-1, 520-2, 520-*n* based on attributes such as frequency, timing, modulation codes, modulation patterns, and so on.

The measurement circuit 540 detects and selects signals from the magnetic sensor 510 and the one or more additional sensors 525 and optionally preconditions (e.g., filters, amplifies, denoises) the detected signals. The magnetic sensor 510 may have a sensing element that is resonant to certain frequencies and may be tuned to respond to those frequencies, allowing the magnetic sensor 510 to detect magnetic fields generated by different magnetic field generators 520-1, 520-2, 520-*n* that operate on different frequencies. For example, the measurement circuit 540 includes bandpass filters that are each centered at different frequencies to extract and differentiate the magnetic fields detected from different individual magnetic field generators 520-1, 520-3, 520-*n*. In one implementation, the bandpass filters are 6th-order finite impulse response (FIR) filters with a 3 dB cutoff at +2 and −2 Hz from a center frequency. If a data rate of the magnetic tracking system 500 is 220 samples/second, the usable bandwidth is about 260 Hz, so different magnetic field generators 520-1, 520-2, 520-*n* may be operated at 70 Hz, 85 Hz, 400 Hz, 115 Hz and 125 Hz in one embodiment.

The measurement circuit 540 may include an analog demodulator and selection filter which serves to convert the detected signal to a baseband (frequency range having signal content of interest). Additionally, the measurement circuit 540 may include a digital signal processor to digitally filter the detected or baseband-converted signal to further select frequency components of interest.

The position analyzer 550 receives output from the measurement circuit 540 and generates spatial position vectors (V1, V2, Vn, and the like), corresponding to each pair of a magnetic field generator 520-1, 520-2, 520-*n* and the magnetic sensor 510. A spatial position vector corresponding to a pair of a magnetic field generator 520-1 and the magnetic sensor 510 represents a position of the magnetic field generator 520-1 relative to the magnetic sensor 510. The spatial position vectors can be input into the selective tracking system 140, e.g., the position determination module 320 of the selective tracking system 140 to determine positions of the target objects relative to the HMD.

The stimulus generation circuit 560 generates signals that modifies biasing and driving properties of the magnetic sensor 510, the one or more additional sensors 525, and the one or more magnetic field generators 520-1, 520-2 520-*n* based on the measured or detected signals. The stimulus generation circuit 570 may receive signals from the position analyzer 550 and from the orientation analyzer 550, or from the measurement circuit 540, and modify one or more properties of the magnetic fields generated by the magnetic field generators 520-1, 520-2, 520-*n* based on the received signals.

Figure 6:
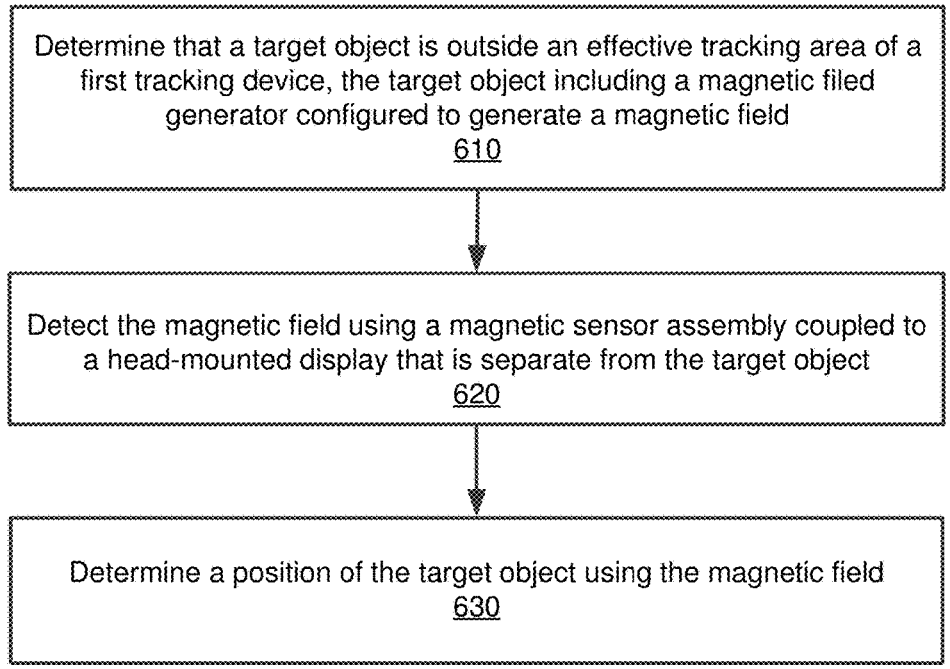
FIG. 6 shows a flowchart of a process for tracking a target object using a magnetic tracking system, according to one or more embodiments.

FIG. 6 shows a flowchart of a process 600 for tracking a target object using a magnetic tracking system, according to one or more embodiments. The process 600 is performed by the selective tracking system 300 described in conjunction with FIG. 3. Alternatively, other components may perform some or all of the steps of the process 600. For example, in some embodiments, a HMD and/or a console may perform some of the steps of the process 600. Additionally, the method may include different or additional steps than those described below in conjunction with FIG. 6. In some embodiments, steps of the method may be performed in different orders than the order described in conjunction with FIG. 6.

The selective tracking system 300 determines 610 that a target object is outside an effective tracking area of a first tracking device, the target object including a magnetic field generator configured to generate a magnetic field. An example of the first tracking device is a depth camera assembly that captures images of a local area. The selective tracking system 140 determines 610 whether the target object is outside the effective tracking area of the first tracking device based on the captured images. For example, the selective tracking system 140 determines 610 that the target object is outside the effective tracking area of the first tracking device in response to a determination that the captured images includes less than 80% of the target object. In some embodiments, instead of determining that the target object is outside an effective tracking area of a first tracking device, the selective tracking system 300 receives or generates a tracking error indicating that that a position of the target object determined based on tracking information generated by the first tracking device is off a predicted position beyond a threshold value.

The selective tracking system 300 detects 620 the magnetic field using a magnetic sensor assembly coupled to a HMD that is separate from the target object. The HMD can be controlled by the target object. The magnetic sensor assembly includes one or more magnetic sensors that detect strength and direction of the magnetic field.

The selective tracking system 300 determines 630 a position of the target object using the magnetic field. For example, the selective tracking system 140 determines spatial position vectors of the magnetic field generator. The spatial position vectors represent spatial coordinates (positions and/or orientations) in a multi-dimensional space that indicate positions of the magnetic field generator relative to the magnetic sensor assembly. Accordingly, positions of the target object relative to the HMD can be determined.

Figure 7:
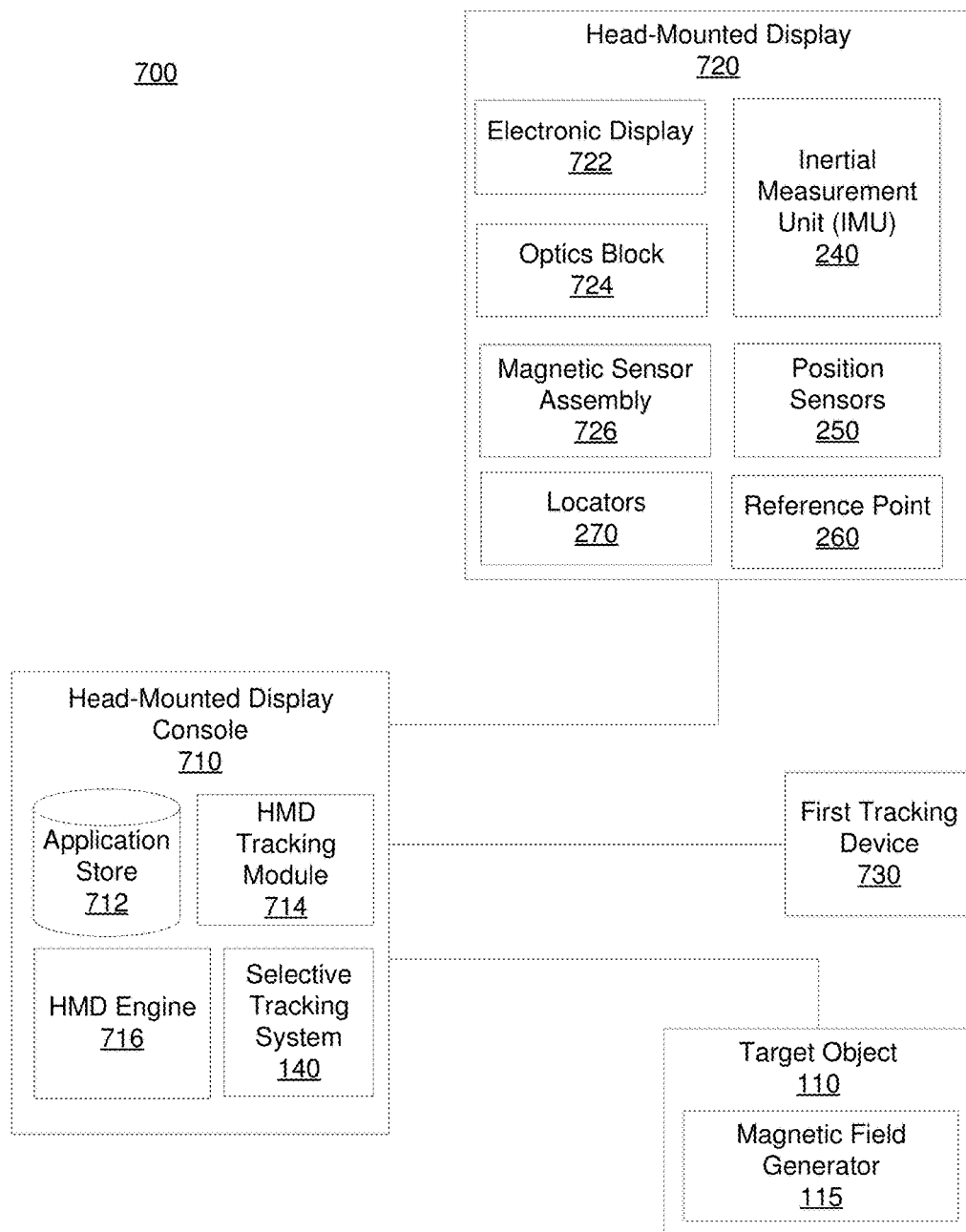
FIG. 7 is a block diagram of a HMD system in which the selective tracking system operates, in accordance with one or more embodiments.

FIG. 7 is a block diagram of a HMD system 700 in which the tracking system 140 operates, in accordance with one or more embodiments. The HMD system 700 may operate in a VR system environment, an AR system environment, an MR system environment, or some combination thereof. The HMD system 700 shown by FIG. 7 comprises a HMD console 710 coupled to a HMD 720, a target object 110, and a first tracking device 730. While FIG. 7 shows an example system 700 including one HMD 720 and one target object 110, in other embodiments any number of these components may be included in the system 700. For example, there may be multiple HMDs 720, each having an associated target object 110 and communicating with the HMD console 710. In alternative configurations, different and/or additional components may be included in the system environment 700. Similarly, functionality of one or more of the components can be distributed among the components in a different manner than is described here. For example, some or all of the functionality of the HMD console 710 may be contained within the HMD 720.

The HMD 120 in FIG. 1 is an embodiment of the HMD 720. The HMD 720 includes an electronic display 722, an optics block 724, an IMU 240, one or more position sensors 250, a reference point 260, and a magnetic sensor assembly 726. In some embodiments, the HMD 720 may also optionally include locators the 270. Some embodiments of the HMD 720 have different components than those described here.

In some embodiments, the IMU 240 receives one or more calibration parameters, e.g., from the HMD console 710. The one or more calibration parameters are used to maintain tracking of the HMD 720. Based on a received calibration parameter, the IMU 240 may adjust one or more IMU parameters (e.g., sample rate). In some embodiments, certain calibration parameters cause the IMU 240 to update an initial position of the reference point 260 so it corresponds to a next calibrated position of the reference point 260. Updating the initial position of the reference point 260 as the next calibrated position of the reference point 260 helps reduce accumulated error associated with the determined estimated position. The accumulated error, also referred to as drift error, causes the estimated position of the reference point 260 to "drift" away from the actual position of the reference point 260 over time. The magentic sensor assembly 726 measures strengths and directions of magnetic fields generated by the magnetic field generator 125 located on the target object 110.

The target object 110 is a device that allows a user to send action requests to the HMD console 710. An action request is a request to perform a particular action. For example, an action request may be to start or end an application or to perform a particular action within the application. The target object 110 may include one or more input devices. Example input devices include: a keyboard, a mouse, a game controller, or any other suitable device for receiving action requests and communicating the received action requests to the HMD console 710. An action request received by the target object 110 is communicated to the HMD console 710, which performs an action corresponding to the action request. In some embodiments, the target object 110 may provide haptic feedback to the user in accordance with instructions received from the HMD console 710. For example, haptic feedback is provided after an action request is received, or the HMD console 710 communicates instructions to the target object 110 causing the HMD input interface 830 to generate haptic feedback after the HMD console 710 performs an action.

The target object 110 includes the magnetic field generator 115 that generates magnetic field. The magnetic field generator 115 includes one or more magnets. Each magnet may generate a magnetic field oriented along a distinct direction. The magnetic field generator 115 is located at a predefined location on the target object 110 and generates a magnetic field that is fixed in relation to the target object 110. Accordingly, spatial positions (and/or orientations) of the magnetic field generator indicates spatial positions (and/or orientations) of the target object 110.

The magentic field generator 115 and the magentic sensor assembly 726 are components of a magnetic tracking system that generates magentic tracking information. The magentic tracking information is generated based on magentic fields generated by the magentic field generator 115 and detected by the magentic sensor assembly 726. The magentic tracking information can include strengths and directions of magnetic fields or spatial relationship of the magentic field generator 115 and the magentic sensor assembly 726.

An embodiment of the first tracking device 730 includes e a camera assembly (e.g., the camera assembly 130 in FIG. 1) that captures images of a local area surrounding the HMD 720, where the target object 110 may also be located. In some embodiments, the camera assembly is part of a depth camera assembly that includes an illumination source that emits structured light into the local area. The first tracking device 730 generates a first type of tracking information and sends the first type of tracking information to the selective tracking system 140. The first type of tracking information can include the captures images or depth information generated based on the captured images. The captured images or depth information can be used to determine positions of the target object 110. In some embodiments, the first tracking device 730 is attached on or included in the HMD 720 so that the captured images can be used to determine positions of the target object 110 relative to the HMD 720. Alternatively, the first tracking device 730 is separate from or external to the HMD 720. The HMD console 710 provides media to the HMD 720 for presentation to the user in accordance with information received from the HMD 720 and/or the target object 110. In the example shown in FIG. 7, the HMD console 710 includes an application store 712, a HMD tracking module 714, and a HMD engine 716, and a selective tracking system 140. Some embodiments of the HMD console 710 have different modules than those described in conjunction with FIG. 7. Similarly, the functions further described below may be distributed among components of the HMD console 710 in a different manner than is described here.

The application store 712 stores one or more applications for execution by the HMD console 710. An application is a group of instructions, that when executed by a processor, generates content for presentation to the user. Content generated by an application may be in response to inputs received from the user via movement of the HMD 720 or the target object 110. Examples of applications include: gaming applications, conferencing applications, video playback application, or other suitable applications.

The HMD tracking module 714 calibrates the HMD system 700 using one or more calibration parameters and may adjust one or more calibration parameters to reduce error in determination of the position of the HMD 720. Moreover, calibration performed by the HMD tracking module 714 also accounts for information received from the IMU 240. Additionally, if tracking of the HMD 720 is lost, the HMD tracking module 714 re-calibrates some or all of the HMD system 700.

The HMD tracking module 714 tracks movements of the HMD 720. The HMD tracking module 714 determines positions of the reference point 260 of the HMD 720 using position information from IMU data. In some embodiments, the HMD tracking module 714 may use portions of the IMU data to predict a future location of the HMD 720. Additionally or alternatively, the HMD tracking module 714 may use the locators 270 to track movement of the HMD 720. Also, the HMD tracking module 714 may use information generated by the selective tracking system 140 to track movements of the HMD 720. For example, the selective tracking system 140 determines position of an object that is still as to the local area surrounding the HMD 720. Using the positions of the object, the HMD tracing module 714 can determine movements of the object relative to the HMD 720, which is opposite to movements of the HMD 720 in the local area. The HMD tracking module 714 provides the estimated or predicted future position of the HMD 720 to the HMD engine 716.

The HMD engine 716 executes applications within the system environment 100 and receives position information, acceleration information, velocity information, predicted future positions, or some combination thereof of the HMD 720 from the HMD tracking module 714. Based on the received information, the HMD engine 716 determines content to provide to the HMD 720 for presentation to the user. For example, if the received position information indicates that the target object 110 has moved further from the HMD 720, the HMD engine 716 generates content for the HMD 720 that mirrors movement of the target object 110 in an augmented reality environment. Additionally, the HMD engine 716 performs an action within an application executing on the HMD console 710 in response to an action request received from the target object 110 and provides feedback to the user that the action was performed. The provided feedback may be visual or audible feedback via the HMD 720 or haptic feedback via the target object 110.

The selective tracking system 140 determines positions of the target object 110 based on either image tracking information generated by the image tracking system or magentic tracking information generated by the magentic tracking system. The selection is based on whether the image tracking system is associated with a tracking error. The tracking error indicates that the image tracking information generated by the image tracking system cannot effectively determine a position of the target object 110. In instances where there is no such tracking error, the selective tracking system 140 selects the image tracking system; otherwise, it selects the magentic tracking system.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A tracking system comprising:
    a camera assembly configured to capture one or more images of a local area;
    a magnetic field generator coupled to a target object, the magnetic field generator configured to generate a magnetic field;
    a magnetic sensor assembly coupled to a head-mounted display that is separate from the target object, the magnetic sensor assembly configured to detect the magnetic field;
    a selective tracking system configured to track the target object, wherein the selective tracking system is configured to:
        determine whether the target object is within an effective field of view of the camera assembly using the captured images,
        responsive to the target object being outside the effective field of view, determine a position of the target object using the detected magnetic field, and
        responsive to the target object being inside the effective field of view, determine a position of the target object using the captured images.

2. The tracking system of claim 1, wherein the selective tracking system is further configured to:
    determine whether the captured images include at least a threshold percentage of the target object; and
    responsive to determination that the captured images do not include at least a threshold percentage of the target object, determine that the target object is outside the effective field of view of the camera assembly.

3. The tracking system of claim 1, wherein the selective tracking system is further configured to:
    determine the position of the target object based on magnetic tracking information, wherein the magnetic tracking information is generated based on strength and direction of the magnetic field detected by the magnetic sensor.

4. The tracking system of claim 3, wherein the magnetic tracking information includes spatial position vectors representing spatial coordinates in a multi-dimensional space.

5. The tracking system of claim 1, wherein the magnetic field generator is located at a predefined location on the target object and configured to generate the magnetic field that is fixed in relation to the target object.

6. The tracking system of claim 1, wherein the camera assembly is part of a depth camera assembly that includes an illumination source that emits structured light into the local area.

7. A method for tracking a target object comprising:
    capturing, by a camera assembly, one or more images of a local area;
    generating a magnetic field by a magnetic field generator coupled to a target object;
    detecting the magnetic field by a magnetic sensor assembly separate from the target object;
    determining whether the target object is within an effective field of view of the camera assembly using the captured images;
    responsive to the target object being outside the effective field of view, determining a position of the target object using the detected magnetic field; and responsive to the target object being inside the effective field of view of the camera assembly, determining a position of the target object using the captured images.

8. The method of claim 7, further comprising:

determining whether the captured images include at least a threshold percentage of the target object; and responsive to determination that the captured images do not include at least a threshold percentage of the target object, determining that the target object is outside the effective field of view of the camera assembly.

9. The method of claim 7, further comprising:

determining the position of the target object based on magnetic tracking information, wherein the magnetic tracking information is generated based on strength and direction of the magnetic field detected by the magnetic sensor assembly.

10. The method of claim 9, wherein the magnetic tracking information includes spatial position vectors representing spatial coordinates in a multi-dimensional space.

11. The method of claim 7, wherein generating a magnetic field by a magnetic field generator coupled to a target object comprises:

generating the magnetic field that is fixed in relation to the target object by the magnetic field generator that is located at a predefined location on the target object.

12. The method of claim 7, further comprising:

emitting structured light into the local area.

* * * * *